July 5, 1955  P. C. HOLTE  2,712,157
METHOD AND APPARATUS FOR FORMING CORRUGATED TUBING
Filed May 22, 1952  5 Sheets-Sheet 1
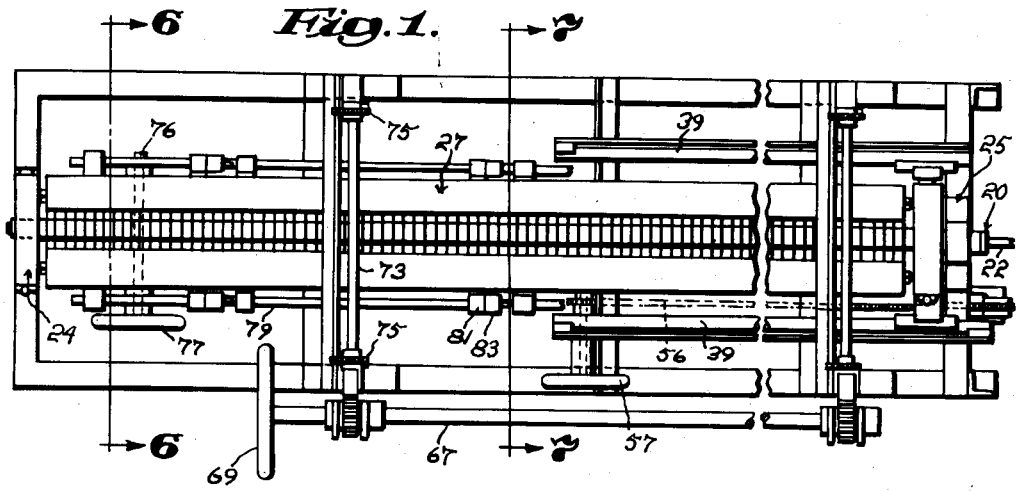
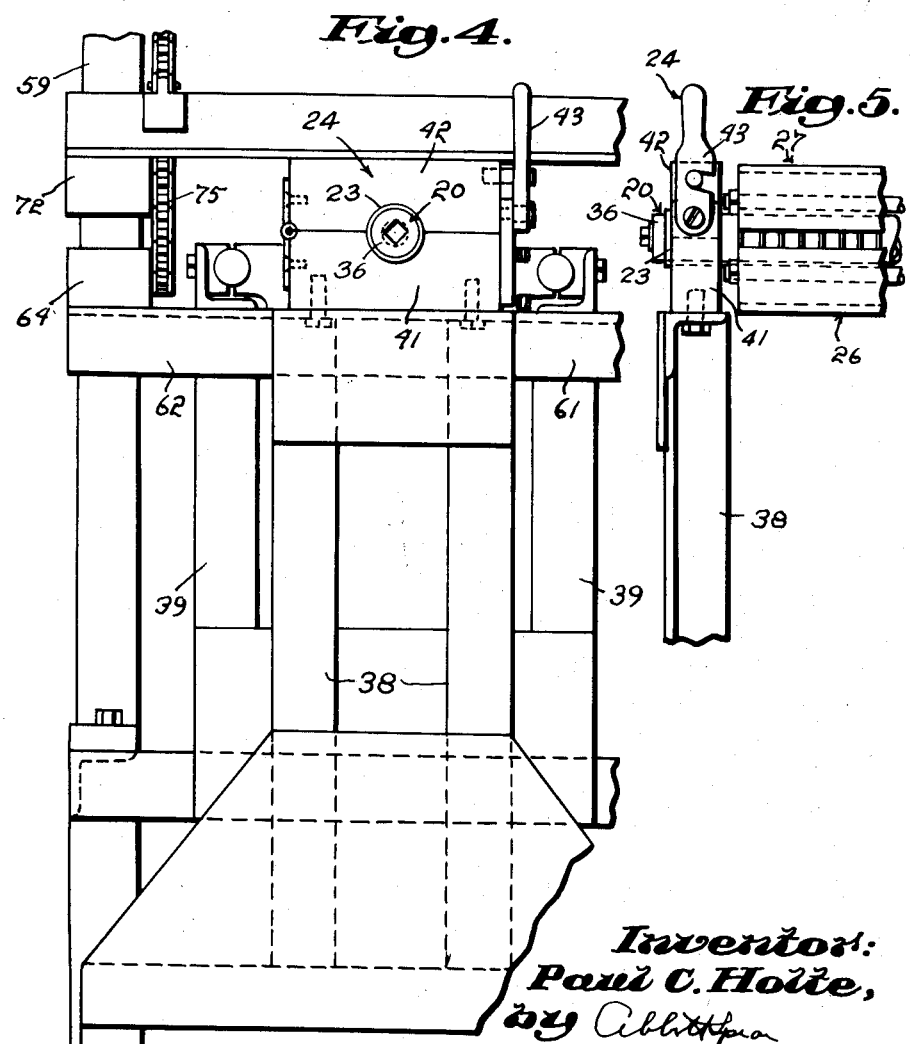
Inventor:
Paul C. Holte,
by [signature]
Attorney

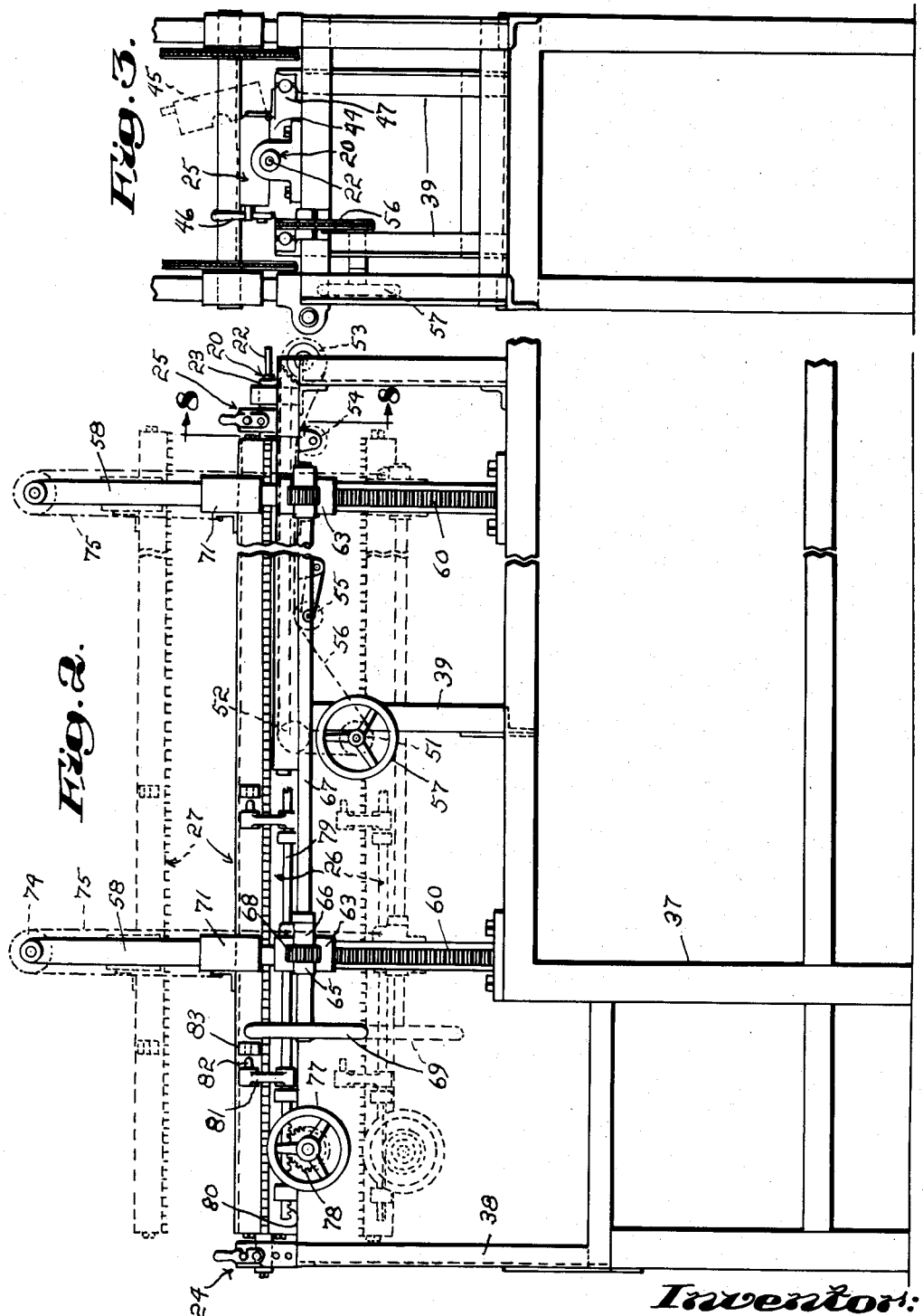

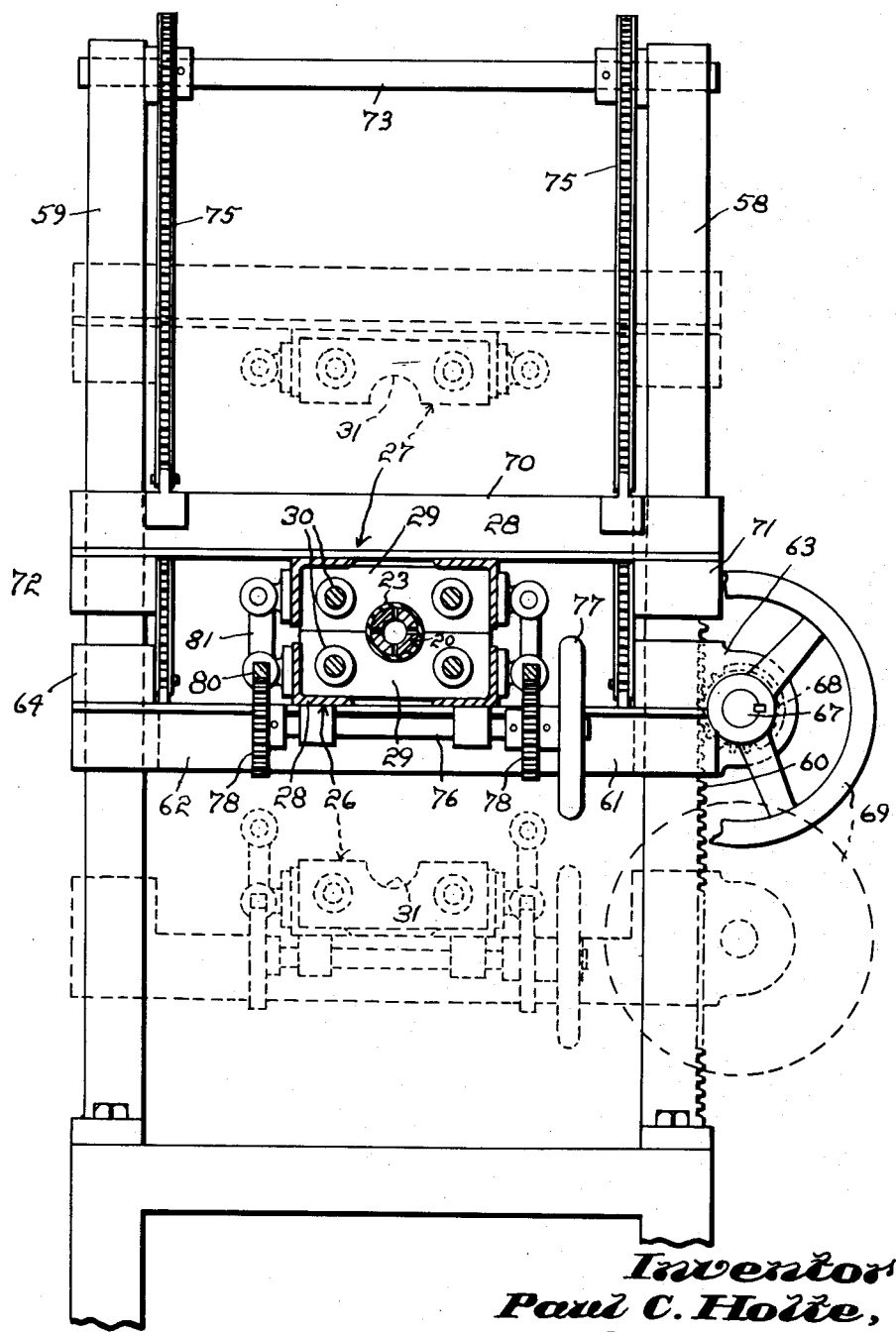

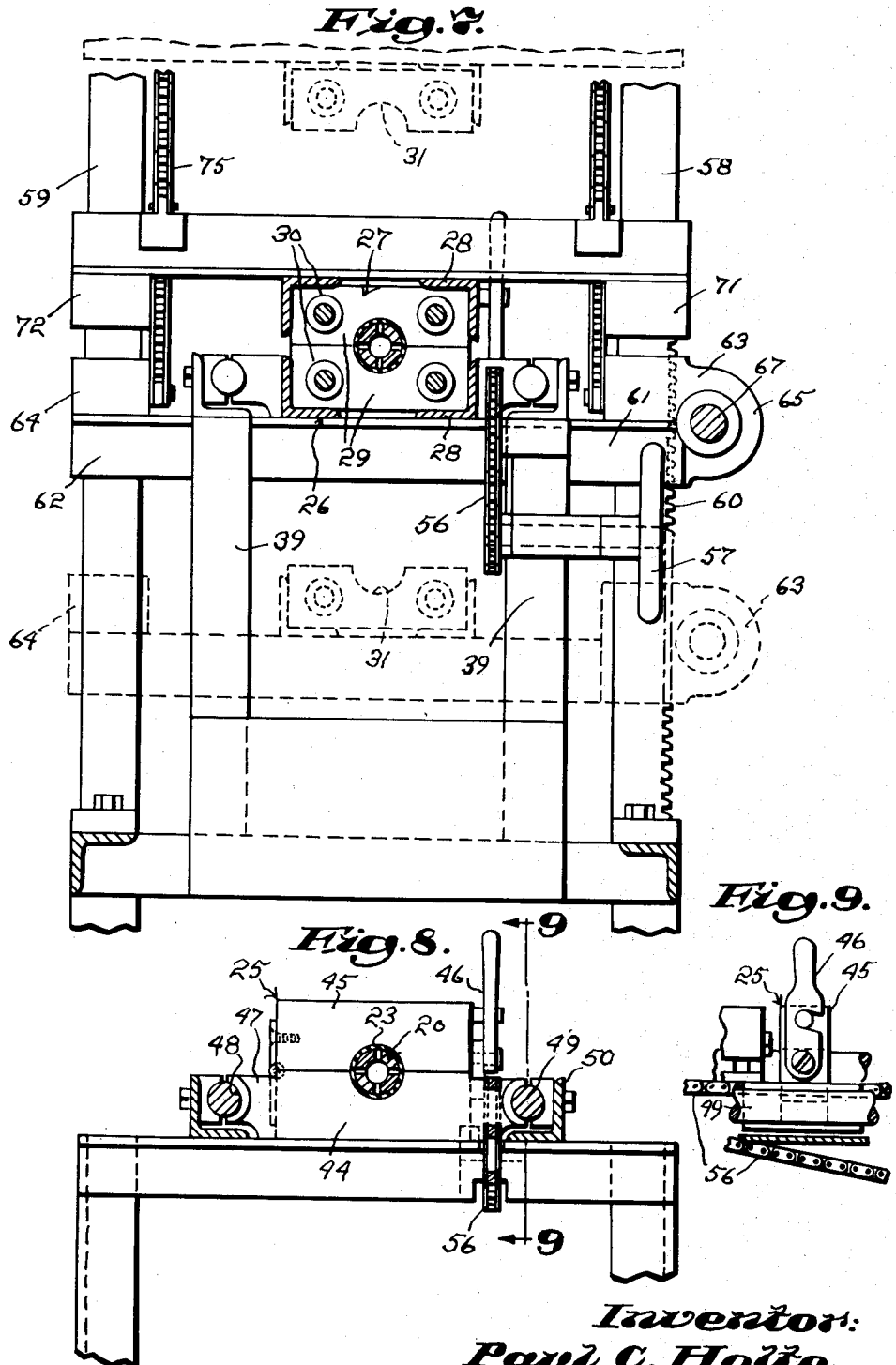

July 5, 1955     P. C. HOLTE     2,712,157
METHOD AND APPARATUS FOR FORMING CORRUGATED TUBING
Filed May 22, 1952     5 Sheets-Sheet 5
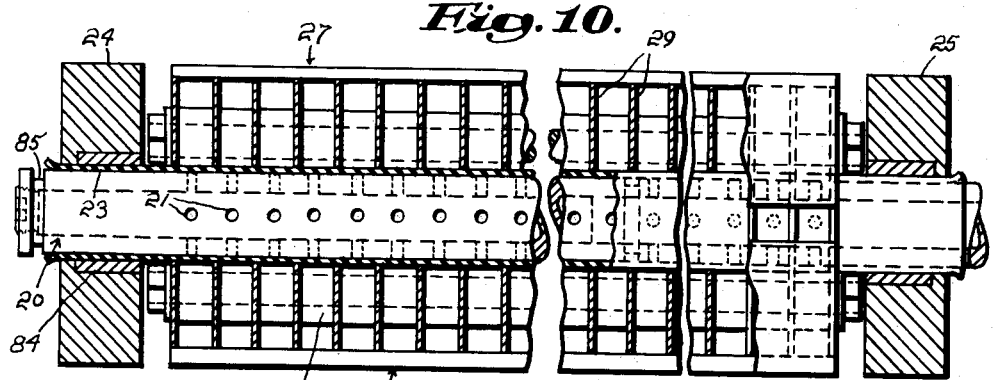
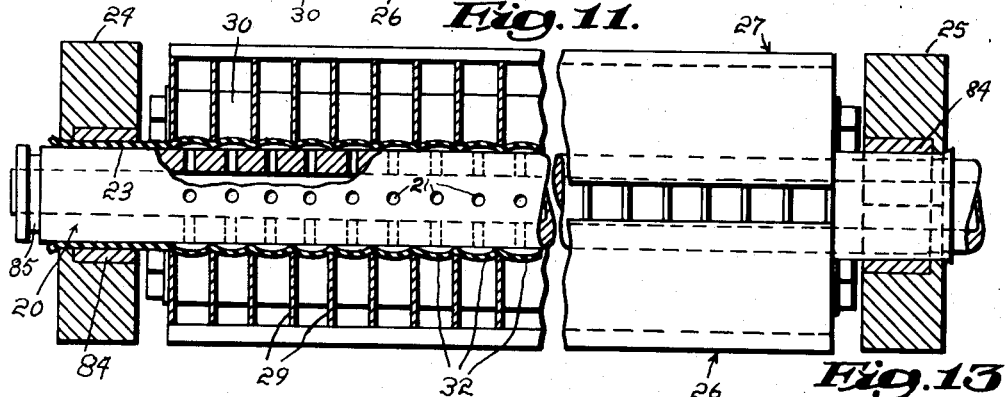
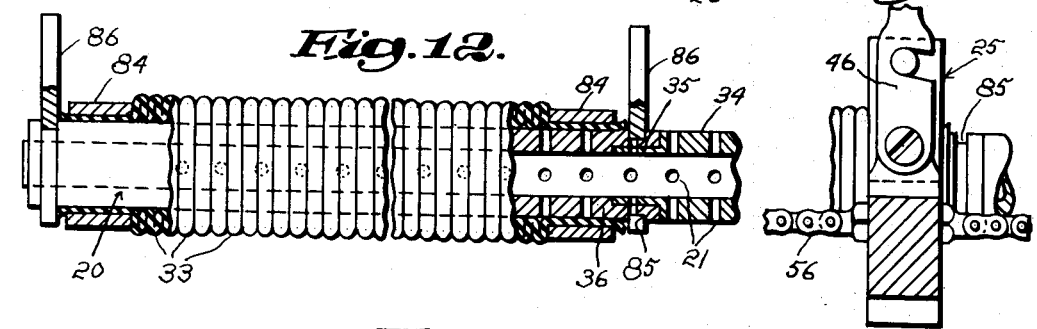
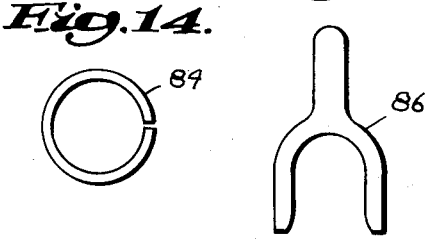
Inventor:
Paul C. Holte,
by Abbott   Attorney United States Patent Office 2,712,157
Patented July 5, 1955

2,712,157

METHOD AND APPARATUS FOR FORMING CORRUGATED TUBING

Paul C. Holte, Weymouth, Mass., assignor to Berns Manufacturing Corporation, Boston, Mass., a corporation of Massachusetts Application May 22, 1952, Serial No. 289,318

12 Claims. (Cl. 18—19)

This invention relates to methods of and apparatus for use in the production of corrugated tubing.

Because of its annular pleats, corrugated tubing may be readily stretched so that a length convenient for storage and handling may be extended to a length adequate for service. There are many uses for such tubing of which vacuum cleaner hose is but one example.

Corrugated tubing must have its pleats well defined and distinct from each other since it is the ability of each pleat to be readily pulled into a substantially collapsed position that enables the tubing to be fully extended and to avoid undue strains. Prior to this invention, production of corrugated tubing has been slow with resulting high cost and has been attended by failure to ensure the formation of pleats of the desired character.

The principal objects of this invention are to enable corrugated tubing to be produced more efficiently and to ensure substantially uniform pleats.

In accordance with this invention, corrugated rubber tubing is made by supporting a length of crude rubber tubing on a mandrel and subjecting the tubing to internal pressure while annularly confining it against expansion in a plurality of axially spaced zones to partially form pleats. The tubing is then freed from external engagement and axially compressed while on a mandrel, which may be a section of the first named mandrel, to complete the formation of the pleats. The tubing is then completed by curing it.

The apparatus preferably consists of a two part mandrel to receive the crude rubber tubing, a pair of vises, each to seal an extremity of the tubing to an end portion of the mandrel, means to deliver air under pressure internally of the tubing, and die sections to be closed against the tubing between the vises. The die sections include portions annularly engaging the tubing in axial spaced relationship to each other so that pleats may be partly formed by inflating the portions of the tubing intermediate said members.

In order that the tubing may be axially compressed while on the mandrel, the die sections are provided with means to so separate them that one of the vises may be slid towards the other to complete the formation of the pleats, the tubing then, preferably, being wholly confined on one of the mandrel parts on which it remains until it is cured.

These and other novel features and advantages of the invention and additional objectives will be apparent from the accompanying drawings which show an illustrative embodiment thereof.

In the drawings:

Fig. 1 is a top plan view of the apparatus.

Fig. 2 is a side view of the apparatus.

Fig. 3 is a view, on an enlarged scale, showing the movable vise.

Fig. 4 is a similar view of the vise at the other end of the apparatus.

Fig. 5 is a fragmentary view of the apparatus showing the vise of Fig. 4 in side view.

Figs. 6 and 7 are sections, on an enlarged scale, taken along the indicated lines 6—6 and 7—7 of Fig. 1.

Fig. 8 is a section also on an enlarged scale taken along the indicated lines 8—8 of Fig. 2.

Fig. 9 is a section along the lines 9—9 of Fig. 8.

Fig. 10 is a partly sectioned view showing the die sections closed against a mandrel supported tube.

Fig. 11 is a view similar to Fig. 10 but with the pleats partly formed by air under pressure.

Fig. 12 is a similar view with the die sections separated and the tubing compressed to complete the formation of the pleats.

Fig. 13 is a fragmentary and partly sectioned view of the movable vise.

Fig. 14 is an end view of the tube gripping ring with which each vise is provided, and, Fig. 15 is a similar view of a keeper adapted to retain the rings in position after the vises have been opened and the mandrel removed from the apparatus.

In accordance with the invention, there is provided a tubular mandrel, generally indicated at 20. Except for its end portions which are closed, the mandrel is shown as formed with a multiplicity of perforations 21. (See Figs. 10–12.) A conduit 22 from a suitable source of air pressure, not shown, leads into the mandrel 20 through one of its closed ends. The mandrel 20 slidably supports a length of crude rubber tubing 23 having its extremities sealed to the end portions of the mandrel as by vises 24 and 25.

Die sections 26 and 27 are adapted to be closed around the thus supported tubing and each of these sections includes a holder 28 and a plurality of relatively narrow and equally spaced partitions 29 supported transversely of the mandrel axis by rods 30. Each partition 29 is shown as having a centrally disposed semi-circular recess 31. When the die sections are closed together, each partition 29 of one die section is in vertical alinement with a corresponding one of the partitions 29 of the other die section to define a hole, the diameter of which is approximately that of the outside diameter of the tubing 23.

Air under pressure is then admitted to the inner surface of the tubing 23 via the mandrel 20 from which it escapes through the mandrel perforations 21 of which there is at least one between each pair of partitions 29. The tubing 23, being sealed at its extremities by the vises and annularly confined at axially spaced intervals by the partitions 29 is inflated between each pair of partitions to a desired extent.

The air pressure is then released but as the tubing 23 is of uncured stock, the inflated shape thereof is substantially retained. There are thus formed by these or equivalent means, a multiplicity of partly formed annular pleats 32, see Fig. 11, these being characterized by their substantial axial length relative to their radial extent and to the general roundness of their section.

The thus partly pre-formed pleats are completely preformed by applying axial pressure to the tubing after the die sections have been separated, while supported preferably by the mandrel 20, as by sliding one of the vises towards the other to compress the partly formed pleats 32 into well defined pleats 33, (see Fig. 12). The pleated compressed tubing is next cured and in order that this step may be most readily effected, the mandrel 20 is preferably formed of two sections with the section 34 having an end portion 35 of sufficiently reduced diameter to be a sliding fit in the adjacent end of the mandrel section 36. When the tubing 23 has been completely formed, its axial length is so reduced that it may be entirely supported by the mandrel section 36 on which it is preferably retained until cured.

In the embodiment of the invention shown in the drawings, there is illustrated apparatus by which pleated tubing may be made efficiently and economically by this method.

That apparatus consists of a base 37 having braced supports 38 at one end thereof. The base 37 also has a pair of supporting frames 39 extending from a point adjacent the other of its ends a substantial distance towards the supports 38. The vise 24 is mounted on the supports 38 while the vise 25 has its first position between the holder 40 for one end of the mandrel section 34 and the adjacent end of the die sections.

The vise 24 is stationary and includes a lower section 41 anchored to the supports 38, and an upper section 42 hinged at one side to the lower section. A manually operated cam interlock 43 is operative to lock the sections together tightly thus to seal an extremity of the tubing 23 to the end of the mandrel section 36 that is supported by the vise 24. (See Figs. 4 and 5.)

The vise 25 (see Figs. 3, 8 and 9) also includes a lower section 44, and an upper section 45, hinged to the lower section at one side. The vise 25 is provided with a cam interlock 46 by which the sections 44 and 45 are drawn together to seal the other extremity of the tubing 23 to the end portion of the mandrel section adjacent the holder 40.

The vise 25 is movable in an axial direction to effect the full compression of the partly formed pleats 32. To accomplish this result, the lower section 44 is provided with oppositely disposed arm portions 47 each having an arcuate recess 48. Extending along the supporting frame 39 on opposite sides of the die sections, when in their closed position, are rods 49 supported by brackets 50. The rods 49 are entered in the recesses 48 and thus serve as tracks slidably supporting the vise 25.

Mounted on one of the supporting frames 39 is a gear 51 over which and idlers 52, 53, 54, and 55 is trained a chain 56, the ends of which are anchored to the vise section 44. By this arrangement, rotation of the gear 51, as by the hand wheel 57, is operative to advance the vise 25 from its first position towards the vise 24 and into its second position adjacent the idler 52 thereby to compress the tubing 23 to complete the formation of the pleats and to transfer the tubing to the mandrel section 36.

Such movement of the vise 25 is, of course, not possible when the die sections are closed together and the means to open and close them will now be described.

Laterally of the path of the vise 25 and of the die sections 26 and 27 there are pairs of standards 58 and 59. Each of the standards 58 has a rack portion 60. The die section 26 has oppositely disposed pairs of arms 61 and 62 provided with mounts 63 and 64, respectively. The mounts 63 and 64 are vertically slidable, respectively, on the standards 58 and 59. The mounts 63 have a pair of spaced bearings 65 and 66 for the shaft 67 and are slotted between their bearings to enable pinions 68 fast on the shaft 67 to mesh with the rack portions 60. The shaft 67 is rotated as by the hand wheel 69.

The die section 27 includes a transverse member 70 provided at its ends with mounts 71 and 72 slidable, respectively, on the standards 58 and 59. A shaft 73 rotatably mounted on the upper ends of the standards is provided with a pair of pulleys 74. Over each of these pulleys is trained a chain 75. One end of each chain 75 is secured to the member 70 and its other end is secured to a mount for the die section 26.

By this arrangement, rotation of the hand wheel 69 in one direction is effective to cause the die section 26 to be lowered and the die section 27 to be raised into their open positions while rotation in the other direction brings them into their closed position.

It is desirable to provide means to lock the die sections together in their closed position. For that reason, there is a shaft 76 (see Figs. 1, 2 and 6) mounted transversely of the die section 26 on its lower surface and adjacent the vise 24. The shaft 76 is shown as rotatable by the hand wheel 77 and has, at each side of the die sections, pinions 78. On each side of the die section 26 is a slide 79 having a rack portion 80 meshing with the adjacent pinion 78. Spaced along each of the slides 79 are locks 81 having pins 82 entrant of socket members 83 on the other die section 27 when the hand wheel 77 is rotated to advance the slide 79 and the die sections are closed.

With reference to the vises 24 and 25, and as may most clearly be seen in Figs. 10–12, the sections of each vise are secured to receive a split clamping ring 84. The rings 84 engage the tubing and effect the sealing of its extremities when the vises are closed. In order that the tubing may be locked to the mandrel section 36, the extremities of that section are shown as having annular grooves 85. A keeper 86 is inserted into each such groove, after the vises have been opened, to lock the rings 84.

From the foregoing, it will be apparent that the invention provides for the production of corrugated or pleated tubing on a novel and efficient basis and apparatus ensuring its efficient production. While particular reference is made to corrugated rubber tubing, it will be understood that such terminology, as employed throughout the specification and claims, means any tubing and particularly tubing that may be shaped but that does not take permanent form until it has been subjected to subsequent treatment.

What I therefore claim and desire to secure by Letters Patent is:

1. The method of making corrugated rubber tubing comprising the steps of supporting a length of crude rubber tubing on a two part mandrel, subjecting said supported tubing to internal pressure while annularly confining it against expansion in a plurality of axially spaced zones to partially form pleats, freeing said tubing from such annular constriction, axially compressing said tubing while on said mandrel to complete the formation of the pleats and to transfer the tubing wholly to one mandrel part, and then curing said tubing.

2. In apparatus for use in forming corrugated rubber tubing, a mandrel to support a length of crude rubber tubing, a pair of vises, each to seal an end of said tubing to said mandrel, means to introduce air under pressure to the inner surface of said tubing, die sections to be closed around the supported tubing and including portions equally spaced relative to the axis of said mandrel and annularly engaging said tubing to restrict its expansion when said tubing is subjected to inflating pressures thereby to partially form pleats in the tubing intermediate said portions, and one of said vises being axially slidable, when said die sections are open, towards the other vise thereby to compress said tubing to complete said pleats.

3. In apparatus for use in forming corrugated rubber tubing, a two part mandrel to support a length of crude rubber tubing, a pair of vises, each to seal an end of said tubing to said mandrel, means to introduce air under pressure to the inner surface of said tubing, die sections to be closed around the supported tubing and including portions equally spaced relative to the axis of said mandrel and annularly engaging said tubing to restrict its expansion when said tubing is subjected to inflating pressures thereby to partially pleats in the tubing intermediate said portions, and one of said vises being axially slidable, when said die sections are open, towards the other vise to compress said tubing to complete the formation of said pleats and to transfer said tubing wholly to one mandrel part.

4. In apparatus for use in forming corrugated rubber tubing, a mandrel to support a length of crude rubber tubing, a plurality of pairs of standards spaced along said mandrel, the standards of each pair being located on opposite sides thereof, top and bottom die sections, between which said mandrel is located, and each including a plurality of mounts, one for each standard and slidable vertically thereon, and means to open and close said die sections, said means including a rack on each standard at one side of said mandrel, a pinion carried by each mount of one die section for those standards in mesh with a respective rack, common means to rotate said pinions, and a connection between the pinion carrying mounts and the mounts for the other die section to move said other die section in a direction opposite to that of the rack controlled die section.

5. In apparatus for use in forming corrugated rubber tubing, a mandrel to support a length of crude rubber tubing, a plurality of pairs of standards spaced along said mandrel, the standards of each pair being located on opposite sides thereof, top and bottom die sections between which said mandrel is located and each including a plurality of mounts, one for each standard and slidable vertically thereon, and means to open and close said die sections, said means including a rack on each standard at one side of said mandrel a pinion carried by each mount of one die section for those standards in mesh with a respective rack, common means to rotate said pinions, a rotatable member carried by each standard, and a flexible element trained over each rotatable member and connected to both mounts slidable on that standard.

6. In apparatus for use in forming corrugated rubber tubing, a mandrel to support a length of crude rubber tubing, top and bottom die sections between which said mandrel is located, means operable to separate said die sections and to bring them together, and a plurality of coacting locking members carried by both die sections, and means connected to the locking members of one die section to move them simultaneously into and out of locking engagement with the locking members of the other die section.

7. In apparatus for use in forming corrugated rubber tubing, a perforated mandrel to support a length of crude rubber tubing, said mandrel having its ends closed, means to introduce air under pressure into said mandrel through one of its ends, means to seal the ends of said tubing to said mandrel, and die sections separate from said sealing means to be closed against said mandrel and including portions equally spaced relative to the axis of said mandrel annularly engaging said tubing to restrict its expansion when said tubing is subjected to inflating pressures thereby to partially form pleats in the tubing intermediate said members.

8. In apparatus for use in forming corrugated rubber tubing, a mandrel to support a length of crude rubber tubing, means to introduce air under pressure to the inner surface of said tubing, a pair of vises to seal the ends of said tubing to said mandrel, die sections to be closed against said mandrel and including portions equally spaced relative to the axis of said mandrel annularly engaging said tubing to restrict its expansion when said tubing is subjected to inflating pressures thereby to partially form pleats in the tubing intermediate said tubings, means operable to open and close said die sections, and means to slide one of said vises axially towards the other vise when the die sections are open to compress the tubing to complete the formation of the pleats.

9. In apparatus for use in forming corrugated rubber tubing, a mandrel to support a length of crude rubber tubing, means to introduce air under pressure to the inner surface of said tubing, a pair of vises to seal the ends of said tubing to said mandrel, die sections between which the mandrel is located, and including portions equally spaced relative to the axis of said mandrel for annular engagement with said tubing to restrict its expansion when said tubing is subjected to inflating pressures thereby to partially form pleats in the tubing, means to move one of said vises axially towards the other vise to compress the tubing to complete the formation of the pleats, and means to move the die sections between a closed operative position and an open position out of the path of said movable vise.

10. In apparatus for use in forming corrugated tubing, a two part mandrel to support a length of crude rubber tubing, means to introduce air under pressure to the inner surface of said tubing, a pair of vises to seal the ends of said tubing to said mandrel, die sections between which the mandrel is located and including portions equally spaced relative to the axes of said mandrel for annular engagement with said tubing to restrict its expansion when said tubing is subjected to inflating pressures thereby to partially form pleats in the tubing, means to move one of said vises towards the other to transfer said tubing wholly to one of said mandrel parts and in such movement to compress the tubing to complete the formation of the pleats, and means to move the die sections between a closed operative position and an open position out of the path of said movable vise.

11. In apparatus for use in forming corrugated tubing, a mandrel to support a length of crude rubber tubing, means to introduce air under pressure to the inner surface of said tubing, and a pair of vises to seal the ends of said tubing to said mandrel, each of said vises including a pair of sections, said sections, when closed together, having a recess disposed towards the tubing, a split ring in said recess the outside diameter of which is approximately that of the pleats to be formed and the inside diameter of which is substantially equal to the outside diameter of the crude rubber tubing, and means interconnecting said vise sections and operative to close said ring thereby to seal said tubing to said mandrel.

12. In apparatus for use in forming corrugated tubing, a mandrel to support a length of tubing and including first and second parts, means to pleat said tubing and to transfer said tubing wholly to said second mandrel part, said means including a pair of vises to seal the ends of said tubing to the ends of said mandrel, one vise being axially movable from the first part to the adjacent end of the second part, each vise including a clamping ring, said second mandrel part having annular grooves, and means engageable with each groove to lock each clamping ring against axial movement relative thereto.

References Cited in the file of this patent
UNITED STATES PATENTS

| | | |
|---|---|---|
| 2,248,898 | Rose et al. | July 8, 1941 |
| 2,347,101 | Harding | Apr. 18, 1944 |
| 2,446,281 | Harding | Aug. 3, 1948 |
| 2,616,129 | Burton et al. | Nov. 4, 1952 |